Figure 1:
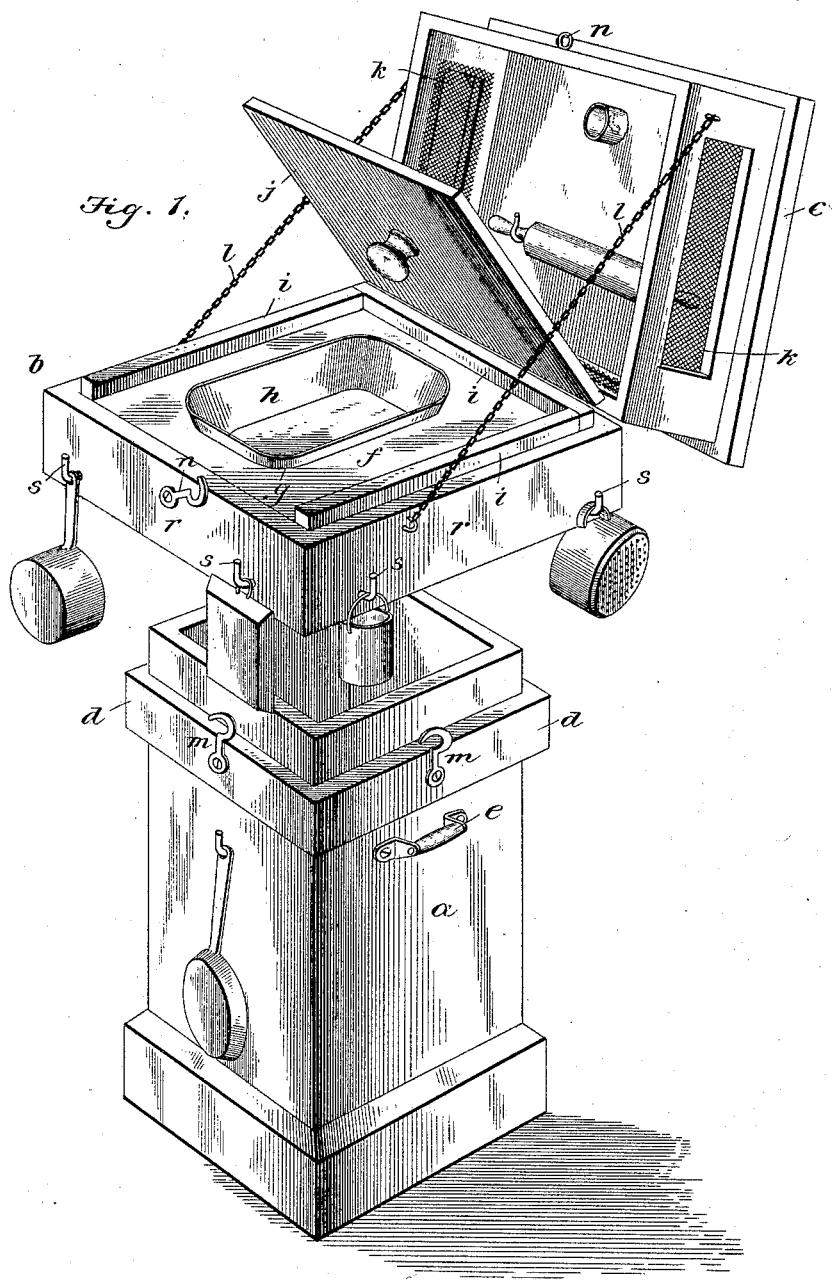

(No Model.) 2 Sheets—Sheet 1.

E. JACKSON.
BREAD AND PASTRY CABINET.

No. 468,623. Patented Feb. 9, 1892.

Witnesses
Guy L. Johnson
Roger Welles.

Inventor
Edmund Jackson
By Johnson & Johnson
his Attorneys (No Model.) 2 Sheets—Sheet 2.
E. JACKSON.
BREAD AND PASTRY CABINET.
No. 468,623. Patented Feb. 9, 1892.
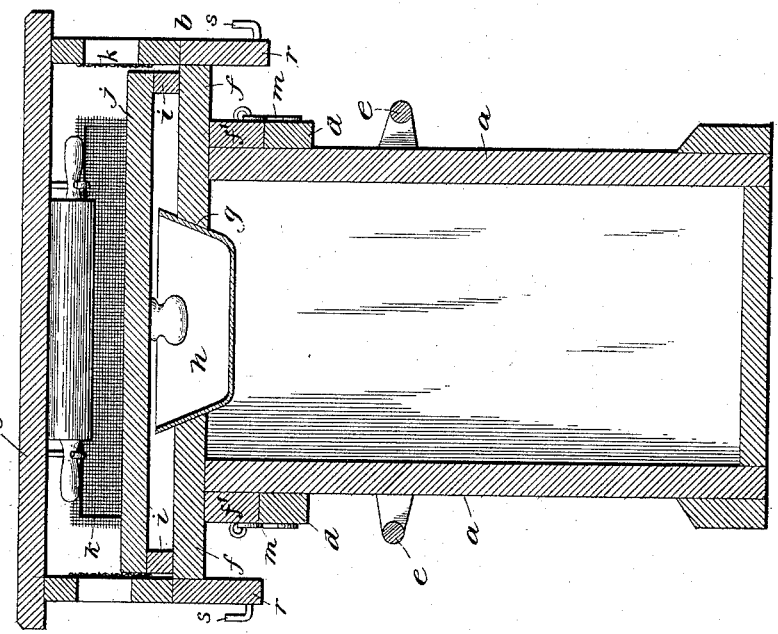
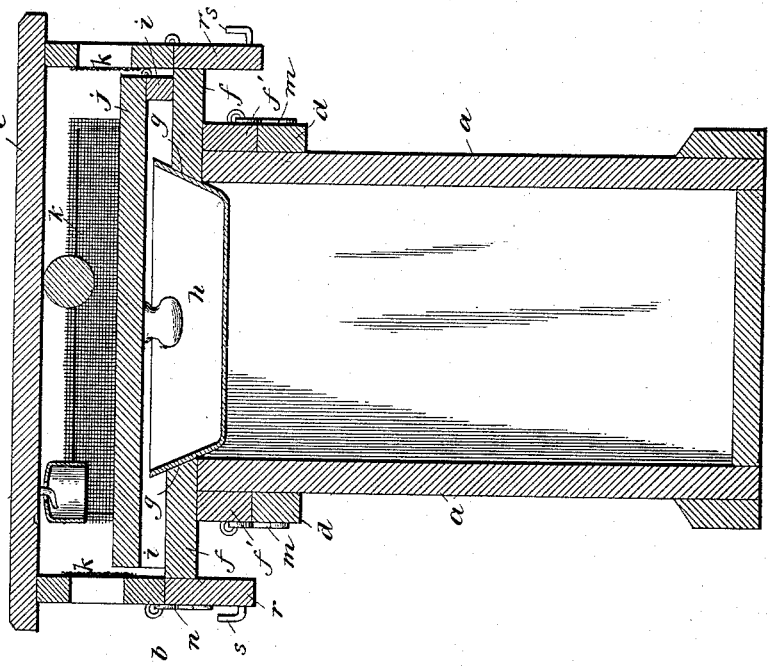
Witnesses
Inventor
Edmund Jackson
By Johnson & Johnson
his Attorneys

UNITED STATES PATENT OFFICE.

EDMUND JACKSON, OF PARIS, TENNESSEE, ASSIGNOR OF ONE-HALF TO THOMAS HARDEN WHITLOCK, OF SAME PLACE.

BREAD AND PASTRY CABINET.

SPECIFICATION forming part of Letters Patent No. 468,623, dated February 9, 1892.

Application filed June 29, 1891. Serial No. 397,871. (No model.)

*To all whom it may concern:*

Be it known that I, EDMUND JACKSON, a citizen of the United States, residing at Paris, in the county of Henry and State of Tennessee, have invented a new and useful Improvement in Bread and Pastry Cabinets, of which the following is a specification.

I have produced a desirable article of kitchen-furniture of improved and novel construction for compactness and for convenience in keeping flour, meal, &c., for preparing and for rolling dough, for cutting biscuit, and for containing the necessary articles used for this purpose, and upon the exterior of which may be hung various cooking utensils for convenient keeping and use, with provision for ventilation and for the exclusion of flies and roaches from the interior.

The accompanying drawings illustrate my improved bread and pastry cabinet, and wherein—

Figure 1 is a perspective view showing the cover raised and the bread-tray in place. Fig. 2 is a vertical section of the same as closed, and Fig. 3 is a similar view taken at right angles to Fig. 1.

The cabinet when closed forms a table. It is made in two separate sections, a stand part $a$ for containing flour and meal and a top part $b$, having a hinged cover $c$, and provision for making dough, rolling and cutting biscuit, &c. The stand part is open at the top, is surrounded just below the latter by cleats $d$, and it has handles $e$, by which it may be moved about. It is made a separate part and open for convenience in filling it with flour and for cleaning and ventilating it when necessary. The top part is constructed of two hinged sections which are considerably wider than the stand, so as to overhang the latter on all sides. The lower of these sections $b$ forms the tray-top and a cover for the stand, for which purpose the tray-top $f$ has cleats $f''$ depending from its under side, so as to telescope with and form a close joining all round the open top of the stand. Within these cleats the tray-top has an oblong opening $g$ to receive the tray $h$, so that it will thereby be held in place and project alike above and below the tray-top. Surrounding three sides of the tray are top surface cleats $i$, to one of which is hinged a board $j$ of a less area than the tray-top, and the surface cleats are of a height to support the board $j'$ above the tray and to form a ventilating-space for the latter by the omission of the cleat at one side. (See Fig. 2.) To the tray-top and at that side at which the board $j$ is hinged, the cover $c$, which forms a close joining all around the said hinged board and incloses it, and for this purpose the cover is made deep enough and to contain hooks for holding a rolling-pin and a biscuit-cutter. The sides of the cover are provided with screens $k$ to permit of free ventilation.

Chains $l$ are provided for connecting the cover with the sides of the tray-top and for holding it open, and when so held open the hinged board $j$ may be supported by the cover when using the tray.

The top part is secured to the stand part by hooks and eyes $m$, and the hinged cover is fastened to the tray-top by a hook and eye $n$.

A hanger drop-board $r$ surrounds the tray-top and is provided with hooks $s$, on which may be hung various tins and cooking utensils, and the overhanging relation of this top drop-board with the stand part permits such utensils to hang partly under the hanger-board and are therefore not so liable to be knocked off and they do not project out so far. For this purpose these hooks may be put in the under edge of the hanger, and, in fact, such tins may be hung on the walls of the stand under the tray-top.

The provision of the depending cleats $f'$ of the top part not only forms a close joining around the open top of the stand part, but they serve to hold the top part firmly on the stand, and in connection with the cleats $d$ of the latter they provide for the hook-fastenings $m$, which secure the top to the stand, so that the cover when opened can be supported by the chain connections with the top part.

I claim as my improvement—

1. A bread and pastry cabinet consisting of a separate stand part open at its top and below the latter surrounded by cleats and a separate overhanging top part having a tray-top provided with a central opening for holding a tray, depending cleats surrounding said open top, surface cleats surrounding three sides of said tray, and a hanger drop-board surrounding said tray-top and provided with hooks, a bread-board hinged to said cleats, and a cover hinged to said tray-top, having ventilating sides and adapted to inclose said tray and tray-top, as set forth.

2. In a bread and pastry cabinet, the combination, with a separate bin-stand part for containing meal, open at its top, of the separate top part fitted upon and hooked to the stand and having an opening containing a removable tray, cleats $i$ on its top surface partially surrounding said tray, the biscuit-board hinged to one side of said cleats and supported thereon over the tray, and a hinged cover, as described.

3. The kitchen-cabinet herein described, consisting of the separate open-top bin-stand $a$, having the wall-cleats $d$, and the separate top part having the depending cleats $f'$, the hanger-board $r$, surrounding and overhanging the stand, provided with hooks $s$, a central opening $g$ for containing a removable tray $h$, top surface cleats $i$, partially surrounding said tray, hinged biscuit-board $j$, supported on said cleats, the hinged cover $c$, the hooks $m$, and the chains $l$, as set forth.

In testimony whereof I have signed this specification in the presence of two witnesses.

EDMUND JACKSON.

Witnesses:
   ALEX. B. WHITE,
   H. C. MCNEILL.